United States Patent

[11] 3,601,635

[72] Inventor David E. Norton
Boulder, Colo.
[21] Appl. No. 840,753
[22] Filed July 10, 1969
[45] Patented Aug. 24, 1971
[73] Assignee International Business Machines Corporation
Armonk, N.Y.

[54] GATED SIGNAL PROCESSING CIRCUITS FOR LOW-LEVEL SIGNALS
8 Claims, 3 Drawing Figs.

[52] U.S. Cl. .......... 307/246, 307/237, 307/282
[51] Int. Cl. .......... H03k 17/00
[50] Field of Search .......... 307/282, 246, 88, 254, 237

[56] References Cited
UNITED STATES PATENTS
2,933,719 4/1960 Kelner et al. .......... 307/88 X
3,174,137 3/1965 Khambaty et al. .......... 307/88 X

*Primary Examiner*—Donald D. Forrer
*Assistant Examiner*—B. P. Davis
*Attorneys*—Hanifin and Jancin and Herbert F. Somermeyer ABSTRACT: A gated signal processing circuit suitable for use with a magnetic core memory as a sense amplifier. Two symmetrical operational amplifiers receive double-ended input signals respectively from a pair of input terminals and supply them to two high impedance lines. Signal gate and DC restore means receive the amplified signals from the high impedance lines. The latter means includes a pair of like-poled identical windings serially connected across the high impedance lines. A pair of gating transistors operable in the so-called inverted mode are respectively connected across the windings for acting as a gate and enabling DC restoration to the high impedance lines. When current conductive, the inverted-mode, operable transistors clamp the high impedance lines to a predetermined reference potential to place the circuit in an inactive operational state during which time no signals are processed. No base current flows into the windings. When such transistors are switched to a high impedance mode (collector current cutoff), the circuit is placed into an active operational state for processing low-level input signals. An output circuit, connected across the high impedance lines, includes a pair of grounded-base connected, silicon junction transistors having their collectors connected to a single output terminal. The silicon transistors provide a signal threshold such that, when the circuit is in its inactive operational state, noise is not passed to the output terminal. The gate transistors are switched to the high impedance mode for a period of time bracketing the low-level signal processing. Such operation enables DC restoration before and after signal processing.

PATENTED AUG 24 1971 3,601,635

INVENTOR
DAVID E. NORTON

BY [signature]

ATTORNEY

GATED SIGNAL PROCESSING CIRCUITS FOR LOW-LEVEL SIGNALS

BACKGROUND OF THE INVENTION

The present invention relates to gated amplifiers suitable for amplifying low-level signals immediately following preceding large amplitude noise or other undesired signals.

Many magnetic core memories include rectangular arrays of ferrite memory cores having a toroidal shape with three wires threading the aperture in each of the cores. Two of the wires are used as drive/selection lines for selectively altering the magnetic remanence of a selected core. The third wire (sense/inhibit or sense line) is shared by two functions:

1. an inhibit function which prevents the altering of magnetic remanence of the core even with appropriate drive signals on the two drive/selection lines, and
2. as a sense wire for carrying the signal induced by a change in magnetic remanence for indicating that change to a circuit (sense). Such induced signals in the sense line have relatively small signal amplitudes. In contradistinction, the inhibit signal has a very large amplitude and immediately precedes the occurrence of the extremely small sense signal. A problem in operating a memory of the type referred to, as is well known, is the detection of the small amplitude signal which is in close time relationship to the large amplitude inhibit signal. An inhibit signal, for example, may be 20 volts or so, while the signal to be sensed is usually measured as a few thousandths of a volt.

Amplifiers termed "sense amplifiers" are responsive to small amplitude signals for processing same to a point for reliable detection of the digital data represented thereby. Generally, a sense amplifier will have a blocking circuit interposed between its input and the sense line. One solution to the problem of separating the small amplitude sense signal from the preceding large amplitude inhibit signal is to connect the inhibit driver or amplifier at one end of the sense/inhibit line and connect the sense amplifier at the opposite end thereof. Because of the characteristics of the intervening magnetic ferrite cores and the characteristics of the line, an appropriately designed DC sense amplifier is usable with a suitable blocking circuit for successfully operating the memory and reliably detecting the sensed signal. In some cases, it is desired to connect the inhibit driver and the sense amplifier to the same end of the sense/inhibit line. Such a connection has certain advantages well known to those skilled in the art. With the latter connection, the noise characteristics and the relationship of the inhibit signal to a sense amplifier is substantially different than the formerly described memory arrangement. In the latter, an AC coupling is required in the sense amplifier to prevent a shift of DC level. Also, since most sense/inhibit lines are formed as a loop to provide a double-ended signal connection, there is a problem of common mode signal rejection. With the common mode rejection and the AC coupling, a circuit is required in the sense amplifier for restoring the DC level to the sensed signal. In many arrangements, a plurality of sense amplifiers have a common output connection to a signal detector which utilizes a timing pulse commonly referred to as a strobe. Accordingly, such sense amplifiers are usually gated between an active operating condition for processing the sensed signal and an inactive operating condition in which all signals are inhibited from being passed through the sense amplifier. Therefore, for reliable operation, it is important that such sense amplifiers, when in the inactive operational state, supply no output signals.

In DC restore operations, there is generally an involvement of impedance switching which includes a circuit having a reactive electrical element. Generally, a high impedance circuit is provided when the signal is to be detected, and a lower impedance circuit is provided when the signal is not to be detected. Means are provided for switching circuit operation between those two impedance states. One difficulty in the impedance switching provided by the prior sense amplifiers is that, for one reason or another, the reactive element associated with the sense amplifier stores energy during the inactive operational state (lower impedance level in the circuit). During this inactive operational state, such reactive elements have stored energy which has the effect of changing the DC level in the output portion of the sense amplifier to some value other than a desired value. Such a change in DC level, if substantial, can adversely affect signal detection of the low-level or small amplitude sensed signal. Also, because of the storage of energy, the noise created in the sense line by the inhibit pulse from the same sense/inhibit line or one from the X or Y drive lines (i.e., the first two mentioned lines) may persist sufficient to overlap the occurrence of the sensed signal. Such operation can cause a false indication of the low-level signal. Therefore, DC restoration should be accomplished substantially without storing energy in the circuit, such as in a capacitor or an inductor.

In electronic systems, for cost and reliability purposes, it is desired to minimize the number of components in a given circuit. In accordance therewith, it is a desirable design criteria to have a single electrical component perform or cause plural electrical functions to be performed. In some instances, when the number of components is reduced in accordance with the above-stated principle, the actual performance of the electrical processing circuit can be substantially improved even though fewer components are required to perform the same function as was previously performed by a larger number of electrical components. In addition to actual improved circuit performance, there should be a corresponding increase in reliability.

While the problem of detection of small amplitude signals in the presence of noise has been described with respect to a readout or sensing operation of a ferrite magnetic core memory, it should be understood that similar problems in other technological areas requiring the operation of signal processing circuits may experience similar problems. Accordingly, the principles, techniques, and features of the below-described invention can be successfully practiced in other areas of interest.

SUMMARY OF THE INVENTION

It is an object of the invention to provide a gating and DC restoring function in a signal processing circuit by a single electrical circuit portion while preventing the storage of electrical energy in a reactive element therein.

It is a corollary object of the invention in connection with the above object to simply and effectively prevent feedthrough of unwanted signals of a signal processing circuit utilizing such single electrical circuit portion for such dual function.

An environment in which the present invention may be practiced includes a circuit having an AC or other amplifier means with double-ended, high impedance output means and, preferably, having feedback means. Feedback coupling means preferably couple the individual feedback means. Such feedback coupling means may include AC bypass means. According to the invention, connected across the high impedance output lines is a signal gate and DC restorer having first and second identical, like-polarized, serially connected winding means with a given mutual inductance therebetween. A power supply is connected between the two winding means. Inverted-mode, operable transistors, such as alloy-junction or epitaxial transistors, are connected across the winding means and are electrically switchable between high (collector current cutoff) and low (collector current conductive) impedance states for gating the circuit between active and inactive operational states, respectively. When in a low impedance state during which time such transistors may operate in an inverted mode, such transistors clamp the output lines to a predetermined potential. Such transistors are connected such that base current therefrom flows directly to a reference potential, thereby not storing energy in the windings. In some instances, such base current amplitude may be larger than the amplitude of signals being processed. When in a high impedance state, the circuit is in the active operational state, and the transistors permit the winding means to develop a voltage thereacross in response to supplied AC signals, while simultaneously providing a DC level to the output line for restoring and maintaining the DC level thereof. For DC restoration, the transistors are switched to the high impedance state during a period of time bracketing the processing of low-level signals. Output means, such as grounded-base connected, silicon junction transistors, are connected respectively by their emitters to the output lines. The collectors of the output silicon transistors are joined to a single output terminal. The characteristics of the emitter-base junction of such silicon transistors provide a small but effective voltage threshold such that, when the gate transistors are clamping the output lines, any small noise signals appearing thereon are prevented from reaching the output terminal.

In accordance with the above description, an important feature is the absence of control currents (such as base current of the inverted-mode operable transistors) in the signal processing portions of the circuit. Within this feature is the selection of field effect transistors as a substitute for the inverted-mode operable transistors. Presently, the inverted-mode operable transistors are less expensive to purchase; therefore, are preferred for practical embodiments of this invention.

When the invention is applied as a sense amplifier in a magnetic core memory, the sense line may supply double-ended signals to a pair of operational amplifiers through a blocking circuit. The blocking circuit is designed to pass only a given polarity signal on either of the input lines and block the other polarity signal. Such an arrangement prevents an inhibit or a Z-drive signal from reaching and destroying semiconductive elements in the operational amplifier. The operational amplifier preferably is of the integrated circuit-type. The feedback coupling means may consist of a capacitor and resistor in series circuit and connected to the emitter electrodes of feedback transistors in the respective operational amplifiers.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
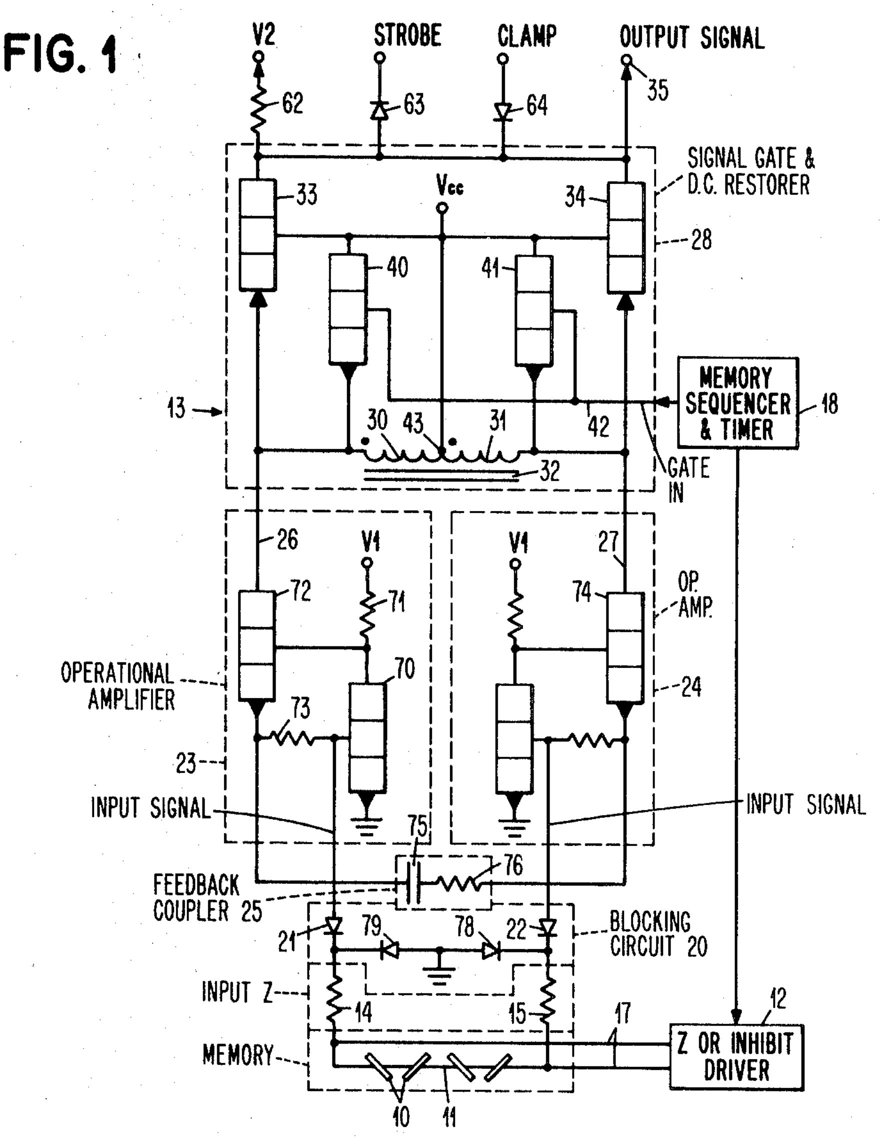
FIG. 1 is a schematic diagram of a circuit embodying the present invention.

Referring now more particularly to FIG. 1, there is shown a core memory unit in abbreviated form having a plurality of toroidal ferrite memory cores 10. Sense line or winding 11 is threaded through cores 10. Line 11 is used both for inhibit and sense functions and is connected both to a sense amplifier generally denoted by numeral 13 and to Z or inhibit driver 12. An input impedance circuit consisting of characteristic impedance resistors 14 and 15 connect line 11 to a pair of input lines 16 of amplifier 13. Similarly, lines 17 connect inhibit driver 12 to one end of resistors 14 and 15. This general configuration is a common arrangement for a sense/inhibit driver 12 and sense amplifier 13 which are connected to the same ends of sense/inhibit line 11. For simplicity purposes, the X and Y drive lines associated with a ferrite core memory have not been illustrated. The memory is timed by memory sequencer and timer 18 of known design. For purposes of understanding the present invention, it is sufficient to know that timer 18 supplies a later-described "gate-in" pulse a predetermined time after enabling inhibit driver 12 for selective operation as is known.

The sensing portion of the circuit arrangement includes blocking circuit 20 receiving sensed signals over input lines 16. Circuit 20 consists of a pair of like-poled diodes or unidirectional current conducting devices 21 and 22. It is apparent that, if a large, positive signal appears on either of lines 16, the respective diodes 21 or 22 will be reverse-biased to current nonconduction, thereby preventing the positive signal from entering operational amplifiers 23 and 24. Such operational amplifiers are responsive to positive signals for causing current conduction in semiconductive devices, later described. Such large, positive polarity signals as supplied by inhibit driver 12 would cause such semiconductive devices to be destroyed. On the other hand, a negative polarity signal on either of lines 16 forward biases diodes 78 and 79 clamping the nodes of diodes 21, 79, and 22, 78 to ground, thereby limiting the signal amplitudes passed by circuit 20. Feedback coupler 25 is connected between operational amplifiers 23 and 24 operates as later described.

Each of operational amplifiers 23 and 24 have a high impedance output portion connected to lines 26 and 27, respectively. This arrangement enables efficient transfer of small amplitude signals to signal gate and DC restorer circuit 28. Circuit 28 gates sense amplifier 13 between an active operational state and an inactive operational state. When sense amplifier 13 is in an inactive operational state, circuit 28 clamps the electrical potential on lines 26 and 27 to a reference potential such that no signal will be transferred from the operational amplifiers to output terminal 35. When the sensing amplifier is to be in the active operational state, a high AC impedance is presented by circuit 28 to lines 26 and 27 for enabling transfer of the small amplitude signals to output terminal 35. Simultaneously therewith, it provides a DC restoration of the current on lines 26 and 27.

Signal gate and DC restorer circuit 28 includes a pair of winding means 30 1 31 serially connected between lines 26 and 27. A low-reluctance linear magnetic core 32 is inductively associated with both windings means 30 and 31 for providing mutual inductance therebetween. Since sensing amplifier 13 is symmetrically constructed and operated, the turns ratio between windings 30 and 31 is unity. Windings 30 and 31 provide a low impedance DC path for collector supply voltage (Vcc) to operational amplifiers 23 and 24 and, when amplifier 13 is in the active operational state, provide a high AC impedance to AC signals supplied over lines 26 and 27. This allows for the signal generated change in current in lines 26 and 27 to be transferred with a low loss through either transistor 33 or 34 (dependent upon polarity) to output terminal 35. The emitter electrodes of such output transistors are connected to the high impedance output lines 26 and 27. Being in the grounded-base configuration, as shown, such transistors function in circuit 28 similar to a pair of diodes for providing full wave rectification of the double-ended signal supplied over input lines 16. The collector electrodes of transistors 33 and 34 are joined together and connected to output terminal 35, wherein a single-ended output is supplied.

It is preferred that transistors 33 and 34 be of a silicon junction-type. The reason is that the emitter-base junction of such transistors has a relatively high conduction threshold; that is, in the order of magnitude of 0.6 volts. Such threshold is useful in the assistance of preventing feedthrough of undesired signals when sensing amplifier 13 is in its inactive operational state. While sense amplifier 13 is in its active operational state, transistors 33 and 34, being in a common base configuration, provide an efficient transfer of current from lines 26 and 27, respectively, to output terminal 35. It is known that the base current of a junction transistor is a very small percentage of the emitter current supplied from lines 26 and 27. The ratio of collector current to emitter current in a silicon transistor grounded-base configuration is typically between 0.98 and unity. That is, practically all of the current being supplied to the emitter electrodes of transistors 33 and 34 arrive at the output terminal 35. When processing small amplitude signals, it is important that the maximum amount of energy in such signals is utilized for improving the reliability of such signal processing.

The gating function for switching sense amplifier 13 between active and inactive operational states is performed by switching gate transistors 40 and 41 between high and low impedance states, respectively. These latter two transistors are gating control elements and DC restorers in signal gate and DC restorer circuit 28. When "gate-in" signal 50 from timer 18 at terminal 42 is relatively positive, both transistors 40 and 41 are switched to their low impedance state. When transistors 40 and 41 are in such low impedance state, collector supply voltage (Vcc) is transferred directly to lines 26 and 27, respectively, through transistors 40 and 41. The impedance of these two transistors is so low that the voltage or electrical potention on lines 26 and 27 is clamped to Vcc. With such clamping action, no signals are processed through sense amplifier 13. However, it must be remembered that there is a finite small impedance in each of the transistors 40 and 41. Therefore, it is not perfect clamping action. If a large signal should happen to be processed through operational amplifiers 23 and 24, there could be caused a small signal to appear on lines 26 and 27. To prevent such a possibility from causing a small signal to be supplied to output terminal 35, thereby falsely indicating a sensed signal, transistors 33 and 34 provide the above-mentioned threshold to block such signals. Such threshold (0.6 volts) is in respect to Vcc, the clamping potential. The base electrodes of transistors 33 and 34 are connected directly to Vcc, which is AC ground. Since transistors 40 and 41 are current conductive, windings 30 and 31 are effectively shorted and are thereby unable to develop any substantial voltage due to AC signals on lines 26 and 27.

In the active operational state of amplifier 13, transistors 40 and 41, being in a high impedance state, are effectively an open circuit. Windings 30 and 31 then are primary factors in circuit 28 operation. Windings 30 and 31 present a low impedance to DC current flowing between Vcc and the collectors of transistors 72 and 74 of operational amplifiers 23 and 24, respectively. However, any AC signals supplied over lines 26 and 27, respectively, see relatively large impedances presented by the inductances of windings 30 and 31. Therefore, a substantial AC signal excursion occurs on lines 26 and 27 to pass signals through transistors 33 and 34 to output terminal 35. The cooperation of windings 30 and 31 with the high impedance inputs on lines 26 and 27 and output transistors 33 and 34 in such that the current supplied to output terminal 35 is equal to twice the AC current on one of the lines 26 or 27, as modified by the emitter-collector current gain of transistors 33 and 34.

Such doubling of current amplitude is explained with respect to transistor 33; the operation with respect to transistor 34 is identical. First of all, it must be remembered that the small amplitude desired signal appears as a double-ended signal across input lines 16. What this means is that, as the current amplitude on the one of the lines increases, there is corresponding and equal decrease on the other line. Such electrical signal changes for a double-ended signal are always symmetrical. This relationship exists as long as parasitic capacitance or other distributed circuit parameters are not introduced into the circuit, such as to distort the described relationship.

In any event, for purposes of illustration, assume that the current amplitude on line 26 is increasing which means that the voltage amplitude on line 26 is decreasing. Let the increase in current amplitude, actually the AC signal on line 26, be represented by Iac. This action is caused by the dynamic electrical impedance of transistor 72 decreasing. Simultaneously therewith, because of the symmetry of circuit operation, current flow from source Vcc through winding 31 into the collector electrode of transistor 74 decreases. However, because of the like polarity and mutual inductance between windings 30 and 31 plus the increasing current in winding 30, a corresponding increase in current amplitude occurs in winding 31. This increasing current flow through winding 31 is toward line 27. This action plus the decreasing current flow into the collector of transistor 74 by a like amount, results in an increasing current flow of 2*Iac* into the emitter of transistor 34 and thence to terminal 35. Simultaneously, transistor 33 has a low conductivity such as to supply no signals to terminal 35.

Correspondingly, when transistor 74 is becoming more current conductive, an increasing current is drawn through winding 31 toward line 27. The voltage on line 27 is decreasing such that no current is supplied through transistor 34. Simultaneously, transistor 72 is becoming more current nonconductive to raise the voltage on line 26. The action of the circuit is reversed thereby to supply twice the increasing current change on line 27 through the emitter electrode of transistor 33.

Therefore, entering the emitter electrode of transistors 33 or 34 is a current amplitude (*Iac*+*Iac'*) equal to twice the change in current amplitude of the signal supplied by operation amplifier 23. Because current gain of grounded-base transistors 33 and 34 are somewhat less than unity, current amplitude changes appearing at output terminal 35 are somewhat less than *Iac*+*Iac'* or 2*Iac*, for example 0.98 (2*Iac*).

From the above description, it is seen that in a double-ended signal one-half of the electrical energy appears on one line and the other half of the electrical energy appears on the other line. The signal gate and DC restorer circuit 28 receives both such one-half energy signals over lines 26 and 27 and cooperates with such signals when in the active operational state to supply substantially all of the energy contained in such double-ended signals through either transistor 33 or 34 to output signal terminal 35 as a single-ended unipolar (rectified) signal. That is, the output electrical signal is essentially carried over one line with the voltage being measured from that one line to a reference potential.

Figure 3:
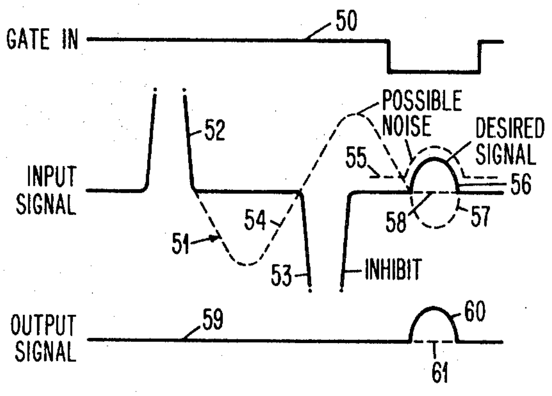
FIG. 3 is a set of simplified-idealized signal waveforms used in the description of the operation of the FIG. 1 illustrated circuit.

During the just-described operation of signal gate and DC restorer circuit 28 during the active operational state of amplifier 13, both transistors 40 and 41 are in a high impedance state. Such high impedance is caused by gate signal 50 having a relatively negative potential; a positive potential in gate signal 50 causes transistors 40 and 41 to be current conductive. That is to say, both the emitter base and the collector base junctions are reverse biased preventing current flow therethrough. Referring momentarily to FIG. 3, it is seen that gate signal 50 supplied over terminal 42 has a negative potential portion bracketing desired signal 56, such that transistors 40 and 41 are in the current nonconductive or high impedance state before and after desired signal 56 is processed by signal processing circuit 13. During these periods of quiescence, when there is no signal processing being performed, a DC restore function is accomplished.

The utilization of the inverted-mode capabilities of transistors 40 and 41 during the inactive operational state of amplifier 13 is now described. During this period, transistors 40 and 41 are biased to current conduction by gate signal 50. When current conductive, the operation of transistors 40 and 41 is such as to clamp the voltage across windings 30 and 31 for preventing the transfer of signals through transistors 33 and 34. During such inactive operational state, transistors 40 and 41 move between the so-called inverted-mode of operation and a usual mode of operation for providing bidirectional clamping of circuit 28, as will become apparent from the following description. The important result of such operation is that base current enabling transistors 40 and 41 to be current conductive flows between terminal Vcc and line 42 via the collector-base junctions. None of such base currents flow through windings 30 and 31. Therefore, there is no energy input to the signal processing portions of amplifier 13 by the base or control currents which, in some amplifications, may exceed the amplitude of the signals being processed.

Figure 2:
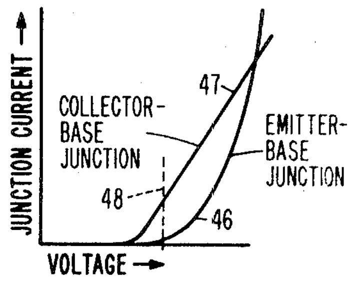
FIG. 2 is a graphical presentation of the emitter-base and collector-base junction voltage-current characteristics of an inverted-mode operable transistor.

The inverted mode and usual mode of operation of transistors 40 and 41 is first described. Such inverted mode of operation is most easily accomplished by the selection of alloy or epitaxially grown transistors as transistors 40 and 41. An epitaxial transistor is preferred because of the higher frequency response. For purposes of describing the present invention, it is sufficient to describe the transistor operation for both alloy and epitaxial transistors as being the same. It is understood, of course, that transistors of types other than that mentioned herein may be utilized in the same manner. During the so-called usual mode of operation, as shown in FIG. 2, the emitter-base junction current, represented by line 46, exceeds the amplitude of the collector-base junction current, represented by line 47. This represents a situation wherein base current flows between the emitter electrode and the base electrode. However, by proper biasing using known techniques, a zone of inverted operation is accomplished wherein the collector-base junction current exceeds in amplitude the current flowing through the emitter-base junction. This is represented in FIG. 2 by the area of operation to the left of vertical dotted line 48. In the inverted mode of operation, the base of control current flows between the base electrode and the collector electrode rather than between the emitter electrode and the base electrode.

Assume now that both transistors 40 and 41 are biased to current conduction for placing amplifier 13 in the inactive operational state. Assume, for purposes of discussion, that a relatively positive signal is supplied over line 26 and a corresponding relative negative is supplied over line 27. We will now see how the operation of transistors 40 and 41 clamp the signals to a level below the threshold level of transistors 33 and 34 to prevent the transfer of signals to terminal 35. It is remembered that there is about a 0.6 volt threshold before either transistor 33 or 34 will become current conductive. The relatively positive going signal on line 26 causes a positive voltage gradient from the emitter electrode of transistor 40 to its collector electrode. It will then operate in the inverted mode preventing substantially and voltage from being developed across winding 30 from line 26 to junction 43. By transformer action through magnetic core 32, winding 31 is also clamped. The relatively negative going voltage on line 27 biases transistor 41 positively between the collector and emitter electrodes. This means that the emitter electrode is negative with respect to the gate signal 50 on line 42. This causes the usual mode of transistor operation. Therefore, current flow between junction 43 and the emitter electrode of transistor 41 is clamped thereby across winding 31. By transformer action, such clamping action is also applied to winding 30. Therefore, it is seen that the inverted mode of operation of transistor 40, plus the usual mode of operation of transistor 41, both clamp the voltage across windings 30 and 31. Such joint clamping action is sufficient to prevent a substantial buildup of voltage on line 26. Because of the symmetrical nature of the circuit, any positive excursion of voltage on line 27 and a corresponding negative excursion of voltage on line 26 cooperate to cause transistor 41 to operate in the inverted mode while transistor 40 operates in the usual mode of operation. The clamping action is reversed but identical to that described with respect to transistor 40 being in the inverted mode. The voltage differentials between the collector and emitter electrodes of transistors 40 and 41 are quite low.

The just-described inverted mode of transistor action enables no base or control currents to flow through either windings 30 or 31. As such, the signal processing portions of amplifier 13 are unaffected by the amplitudes of such control currents. Another semiconductive device providing low and high impedance states and connectable into the illustrated circuit and performing the same functions as the inverted mode operable transistors is the field effect transistor (FET). A characteristic of the FET is that its low and high impedance states are provided with negligible gate current flow. Such is especially true for the insulated gate-type of FET. As such, the FET supplies negligible gate or control current to windings 30 and 31, thereby not adversely affecting signal processing circuit operations in many low amplitude signal processing applications.

The operational relationships of circuit 28 operation with respect to the illustrated memory and inhibit driver operation is described with respect to FIG. 3. Input signal 51 is supplied over lines 16 to amplifier 13. Positive and negative excursions 52 and 53 represent the Z or inhibit driver 12 supplied signals to inhibit line 11. The peaks of the excursions 52 and 53 have been abbreviated to save space in the drawing. It is understood that these peaks may be as high as 20 volts when the desired signal 56 may have an amplitude of a few millivolts. Because of the relatively large excursions of voltage, a noise signal represented by dotted line 54 is induced in the memory sense line 11 and then appears on lines 16. Such noise signal is many times amplitude of desired signal 56. In many instances of prior art, such noise signal may cause a shift in DC or reference level on lines 26 and 27 or their equivalent in other circuits causing the reference level to be as indicated by dotted line 55. A positive going excursion on line 55 corresponds to desired signal 56 being superimposed thereon. If amplitude detection is used for detecting desired signal 56, it is seen that the reference level may have a very important effect on detection. In fact, if the reference level represented by line 55 exceeds the amplitude of the desired signal 56, then a false indication could be obtained in detection circuitry of known design. Also, desired signal 56 can be of either polarity from a memory sense line 11, as represented by dotted line 57. For this reason, sense amplifiers such as sense amplifier 13, are constructed in a symmetrical manner such that either polarity signal can be utilized to provide a unipolar signal at output terminal 35. If none of the magnetic cores 10 coupled to line 11 switch, then there is no change in amplitude in the input signal as represented by line 58. A shift in reference level at output terminal 35 could be falsely detected as a signal 56. Output signal 59, appearing on output terminal 35, should either have the positive going signal 60 or a no signal amplitude change, as represented by dotted line 61, without reference level shift. This invention enables such a desired output signal characteristic in a sense amplifier.

Output terminal 35 may receive desired signals from a plurality of sense amplifiers (not shown) which are connected to a common strobe or detector circuit (not shown). For this reason, the collector electrodes of output transistors 33 and 34 are connected through common load resistor 62 to a source of potential V2. A strobe pulse is supplied to the cathode of diode 63. In the absence of a strobe pulse, output terminal 35 is clamped through diode 63 to a predetermined potential. Such strobe pulse reverse biases diode 63 enabling signals supplied by transistors 33 and 34 to be transferred to such detection circuit. It should be noted that output signal 59, with its positive going excursion 60, would have its waveform changed by the shape of the strobe pulse supplied to the cathode of strobe diode 63. Diode 64 is usually added to prevent the voltage on output terminal 35 from exceeding a predetermined negative amplitude.

Operational amplifiers 23 and 24 are identically constructed and may be of the integrated circuit-type. Transistor 70 is an input transistor having collector load resistor 71 connected to collector supply voltage V1. The collector electrode of transistor 70 is also connected to the base electrode of feedback transistor 72. The collector of transistor 72 is connected to output line 26 as a high impedance or current source. The emitter electrode of transistor 72 is also connected to feedback coupler circuit 25 which, in turn, is connected to the emitter electrode of feedback transistor 74 in operational amplifier 24. The just-described configuration provides high AC gain as is well understood. Assuming that the impedance of diode 21 us negligible, the gain of the circuit arrangement is the ratio of feedback resistor 73 to the input impedance resistor 14. Feedback coupler circuit 25 consists of capacitor 75, which serves as an AC bypass capacitor and resistor 76. It is well known that the feedback connection just described provides a better current source characteristic of the operational amplifiers 23 and 24 to lines 26 and 27, respectively. The feedback coupler 25 has the same voltage thereacross for a common mode signal which then eliminates such common mode signal and makes the cooperative relationship between operational amplifiers 23 and 24 a true differential stage for providing double-ended signals on lines 26 and 27.

While the invention has been particularly shown and described with reference to a preferred embodiment thereof, it will be understood by those skilled in the art that various changes in form and details may be made therein without departing from the spirit and scope of the invention.

What I claim is:

1. A gated signal processing circuit for processing a small amplitude signal following a substantially larger amplitude signal which is to be ignored, a pair of input lines for receiving double-ended signals, first and second amplifiers having input means for receiving said signals and each said amplifier having a high impedance output portion, the improvement including the combination:

signal gate and DC restorer means including first and second like-polarized, serially connected, substantially identical winding means having a given mutual inductance and electrically connected between said high impedance output portions and having a common connection between said winding means for a supply voltage connection, and semiconductive switch means having a control connection for having control signals thereon and being electrically switchable between high and low impedance states in accordance with said control signals and connected across one of said winding means for gating the circuit between active and inactive operational states, respectively, and connected thereacross in a manner such that substantially none of said control signals flow through said winding means.

2. The gated signal processing circuit of claim 1, further including, timing means for supplying a gate signal to said switch means for switching same between said impedance states, and for effecting a DC restore function, said timing means causing said switch means to switch to a high impedance state substantially before said small amplitude signal is processed and causing said switch means to maintain said high impedance state a substantial time after occurrence of said small amplitude signal.

3. The gated signal processing circuit of claim 2, wherein said switch means comprises an inverted mode operable transistor and connected across said one winding means such that any control current flows between said control connection and said common connection.

4. The gated signal processing circuit of claim 2, further including output means having an output terminal, a pair of transistors each having a collector portion electrically connected to said output terminal, a base portion in ohmic electrical connection to said common connection and emitter portion in respective ohmic electrical connection to said high impedance output portions and with a conduction threshold greater than signal voltages developed across said switch means when in said low impedance state.

5. The gated signal processing circuit of claim 2, wherein said transistor means comprise a pair of FET's, respectively connected across said winding means.

6. A gated signal processing circuit for processing a small amplitude signal following a larger amplitude signal which is to be ignored, a pair of input lines for successively receiving double-ended signals of large and small amplitudes, said low amplitude signal occurring at a given time and having a predetermined duration, blocking circuit means connected to said input lines for blocking a first polarity signal and passing a second polarity signal on either of said input lines, first and second amplifiers having input means connected to said blocking circuit means for receiving said second polarity signals and each said amplifier including feedback means and having high impedance output portion, said amplifiers being responsive to said second polarity signals to become current nonconductive but being further responsive to small amplitude signals for processing same to said high impedance output portions, respectively, feedback coupling means including AC bypass means electrically interconnecting said feedback means of said first and second amplifiers, the improvement including the combination:

signal gate and DC restorer means including first and second like-polarized, serially connected, substantially identical winding means having a given mutual inductance therebetween and electrically connected between said high impedance output portions and further having a common connection between said winding means for a supply voltage connection, first and second inverted-mode operable transistors respectively connected across said first and second winding means with emitter portions of said transistors being connected to said high impedance output means, respectively, and having control portions with a control connection for receiving a gate signal in timed relationship to said desired signal but having a duration greater than said desired signal such that said transistors are gated to current nonconduction substantially before receipt of said desired signal and maintain such current nonconduction state for a period after said desired signal is to occur, such that the DC level on said high impedance portions are restored to a predetermined level, and said transistors being responsive to a gate signal for becoming current conductive for clamping the voltage across said winding means, respectively, in either direction with either the clamping in one of said directions occurring while one of said transistors is in an inverted mode of operation while another of said transistors is in a usual mode of operation, and output means for receiving signals from said signal gate and DC restore means as a single-ended signal having substantially the total energy of signals received on both said input lines when said transistors are in said current nonconductive state, said first and second windings cooperate to produce a changing current amplitude flowing to said output means having a changing current amplitude equal to a changing current amplitude supplied by one of said amplifiers, and summing said changing current amplitudes in said output means.

7. A gated signal processing circuit for processing a small amplitude signal following a substantially larger amplitude signal which is to be ignored, a pair of input lines for receiving double-ended signals, first and second input amplifiers with input means for receiving such signals and each amplifier having a high impedance output portion, the improvement including the combination:

signal gate and DC restorer means electrically interconnecting said high impedance output portions to an output terminal including a center tap coil connected between said output portions with a center connection forming electrically balanced winding means therebetween, a supply terminal connected to said center connection, a pair of inverted mode transistor elements each having an emitter portion respectively connected to said high impedance output portions, a base portion and a collector portion, said collector portions being connected to said supply terminal, a pair of rectifier means connected between said high impedance output portions and the output terminal for supplying a like polarity signal thereto from either of said high impedance output portions, and control means connected to said base portions for simultaneously energizing said transistor elements between current conduction and nonconduction by control signals with substantially all of said control signals flowing through said base portion and said collector portion with insignificant portions of such control signal flowing through said winding means.

8. A gated signal processing circuit for processing a small amplitude signal following a substantially larger amplitude signal which is to be ignored, a pair of input lines for receiving double-ended signals, first and second amplifiers having input means for receiving such signals and each said amplifier having a high impedance output portion, an output terminal, the improvement including the combination:

gating control means and DC restorer means electrically interconnecting said high impedance output portions with said output terminal, comprising an inductance electrically interconnecting said high impedance output portions with a center tap on said inductance means, a supply terminal connected to said center tap for receiving a DC supply voltage, a pair of transistor elements interconnecting said supply terminal to said high impedance output portions and a pair of rectifying means having a signal passing threshold and electrically connecting said high impedance output portions to said output terminal for passing like polarity signals having amplitudes greater than said threshold from either of said portions whereby whenever said transistor elements are in a low impedance state, said rectifying elements biased to nonconduction and with a DC voltage applied to said supply terminal, such voltage is supplied to said high impedance output portions for restoring the DC level thereof; when said transistor elements are at a high impedance state, the signal supplied from said amplifiers developing an output voltage across said mutual inductance sufficient for passing said signals to said output terminal.